(12) United States Patent
Chien

(10) Patent No.: US 9,940,554 B2
(45) Date of Patent: Apr. 10, 2018

(54) DATA ANALYSIS AND MANAGEMENT METHODS AND SYSTEMS FOR SOCIAL NETWORKS

(71) Applicant: Zappoint Corporation, Taipei (TW)

(72) Inventor: Hsi-Tsun Chien, Taipei (TW)

(73) Assignee: ZAPPOINT CORPORATION, Taipei (TW)

( * ) Notice: Subject to any disclaimer, the term of this patent is extended or adjusted under 35 U.S.C. 154(b) by 173 days.

(21) Appl. No.: 15/005,057

(22) Filed: Jan. 25, 2016

(65) Prior Publication Data
US 2016/0224678 A1   Aug. 4, 2016

(30) Foreign Application Priority Data
Jan. 29, 2015   (TW) .............................. 104102950 A

(51) Int. Cl.
| G06F 15/16 | (2006.01) |
| G06K 9/78 | (2006.01) |
| H04L 29/08 | (2006.01) |
| G06Q 50/00 | (2012.01) |
| G06K 9/00 | (2006.01) |
| G06K 9/32 | (2006.01) |

(52) U.S. Cl.
CPC .......... *G06K 9/78* (2013.01); *G06K 9/00677* (2013.01); *G06K 9/3258* (2013.01); *G06Q 50/01* (2013.01); *H04L 67/141* (2013.01); *H04L 67/306* (2013.01); *G06K 2209/01* (2013.01)

(58) Field of Classification Search
CPC .... G06K 9/78; G06K 9/00677; G06K 9/3258; G06K 2209/01; G06Q 50/01; H04L 67/141; H04L 67/306
USPC ................................................ 709/204, 206
See application file for complete search history.

(56) References Cited

U.S. PATENT DOCUMENTS

2009/0070852 A1*  3/2009  Chijiiwa .............. G06Q 10/107
                                              726/1
2013/0159435 A1*  6/2013  Liu ....................... H04W 4/206
                                              709/206

* cited by examiner

*Primary Examiner* — Wing F Chan
*Assistant Examiner* — Joseph Maniwang
(74) *Attorney, Agent, or Firm* — McClure, Qualey & Rodack, LLP

(57) ABSTRACT

Data analysis and management methods and systems for social networks are provided. First, specific data is received from a specific registered user of a social network system via a network. The specific data is processed with a data analysis procedure to obtain at least one contact information based on the specific data. Then, a connection with at least one target user who has not registered on the social network system is established according to the contact information.

8 Claims, 7 Drawing Sheets

DATA ANALYSIS AND MANAGEMENT METHODS AND SYSTEMS FOR SOCIAL NETWORKS

BACKGROUND OF THE INVENTION

Field of the Invention

The disclosure relates generally to methods and systems for data processing, and more particularly to methods and systems that can analyze and manage data for social networks.

Description of the Related Art

With the advanced development of devices with network connectivity capabilities and networks, more and more network-related services and applications have been developed. For example, social network systems can be set up based on networks, so that on-line communities can be created for users. Social network systems provide an environment and an interface for users to connect, communicate, and interact with each other via networks. For example, users can share personal thoughts, statuses, photos, life events, and other information. Furthermore, users' friends can share or comment on the posted information.

Along with explosive growth of on-line users, a large amount of various information is generated within the social network systems. The information may be valuable or it may be completely trivial to the various users. However, over time the useless information will become a heavy burden for systems if no effective data analysis and management mechanism is provided. Consequently, managing and performing related analysis for the big data has become a pressing issue for the social network industry.

Furthermore, most applications of data analysis are limited to the data related to the registered users of the social network systems. For example, the data analysis in the social network systems is expected to explore the potential requirements of users according to the data posted by the users themselves, and provide related services or products to those users. In other words, the application of data analysis can provide additional services for existing users of the social network systems. However, the prior art cannot perform any operation when the data consists of information related to third parties who have not registered in the social network systems. In other words, there exists a great opportunity to expand the value of information within social networks to users outside those networks.

BRIEF SUMMARY OF THE INVENTION

Data analysis and management methods and systems for social networks are provided, in which data on a social network system can be analyzed, and the data can be additionally managed according to the result of the data analysis.

In an embodiment of a data analysis and management method for social networks, specific data is received from a specific registered user of a social network system via a network. The specific data is processed with a data analysis procedure to obtain at least one contact information based on the specific data. Then, a connection with at least one target user who has not registered on the social network system is established according to the contact information.

An embodiment of a data analysis and management system for social networks comprises a network connecting unit, a storage unit, and a processing unit. The network connecting unit receives specific data from a specific registered user of a social network system via a network. The storage unit stores the specific data. The processing unit performs a data analysis procedure on the specific data to obtain at least one contact information based on the specific data. The processing unit establishes a connection with at least one target user who has not registered on the social network system according to the contact information.

In some embodiments, the specific user obtains the specific data by using an image capture unit, and the specific data comprises an image. In some embodiments, the data analysis procedure performs an image recognition process on the image to obtain at least a text, number, symbol, and/or figure in the image, and determines the contact information according to the text, number, symbol, and/or figure.

In some embodiments, at least one specific operation regarding the specific data performed by a plurality of candidate users of the social network system is recorded, wherein the specific operation may be a collection, sharing, and/or comments corresponding to the specific data. In some embodiments, it is determined whether the number of candidate users is greater than a predefined threshold value. When the number of candidate users is greater than the predefined threshold value, the data analysis procedure is performed on the specific data. In some embodiments, it is determined whether the number of times corresponding to the performance of the specific operation is greater than a predefined number of times. When the number of times corresponding to the performance of the specific operation is greater than the predefined number of times, the data analysis procedure is performed on the specific data.

In some embodiments, the contact information may comprise a physical address, an email address, and/or a phone number, and an email message, a short message, and/or a physical mail can be transmitted to the target user according to the contact information, so that a connection with the target user is established.

In some embodiments, a specific account is created according to the specific data. Then, a registration request for the social network system is received from the target user via a network, and the specific account is designated for the target user in response to the registration request.

In some embodiments, a registration request for the social network system is received from the target user via a network, and information corresponding to the candidate users, and/or information about the specific operation regarding the specific data generated by the candidate users is provided to the target user in response to the registration request.

Data analysis and management methods for social networks may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed descriptions with references to the accompanying drawings, wherein.

DETAILED DESCRIPTION OF THE INVENTION

Data analysis and management methods and systems for social networks are provided.

Figure 1:
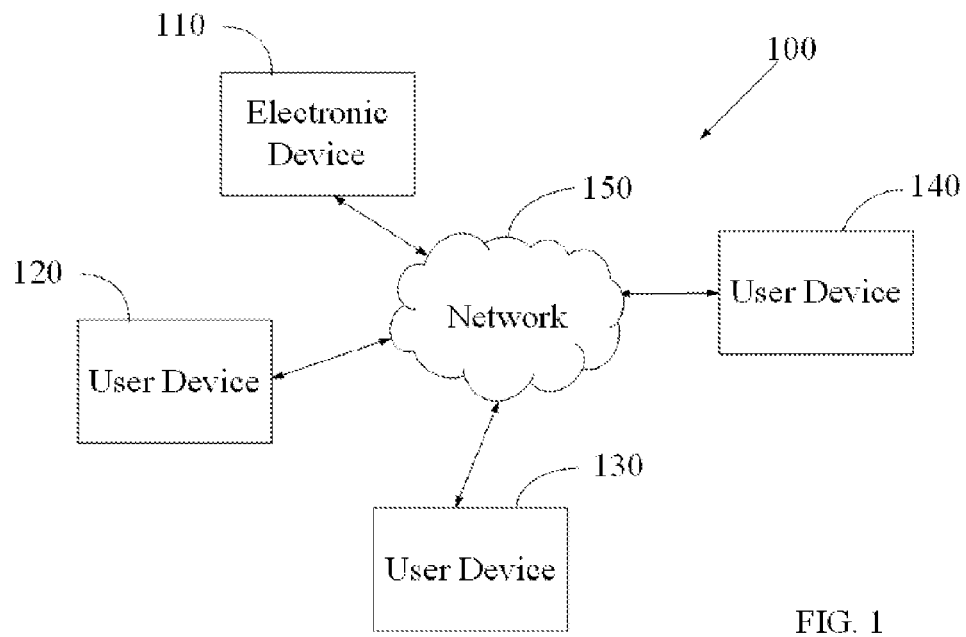
FIG. 1 is a schematic diagram illustrating an embodiment of a data analysis and management system for social networks of the invention.

FIG. 1 is a schematic diagram illustrating an embodiment of a data analysis and management system for social networks of the invention. As shown in FIG. 1, the data analysis and management system for social networks 100 can comprise an electronic device 110 and a plurality of user devices (120, 130 and 140). The electronic device 110 can provide services corresponding to a social network system. A user device may be any electronic device having network connectivity capabilities, such as a computer, or a portable device, such as a mobile phone, a smart phone, a PDA (Personal Digital Assistant), a GPS (Global Positioning System), a tablet, or a wearable electronic device. Each user device can connect to the electronic device 110 for communication via a network 150, such as a wired network, a telecommunication network, and/or a wireless network. It is noted that, the electronic device 110 can manage the users who had registered on the social network system. It is understood that, each user can perform a registration process on the social network system in advance, thus to access the social network system.

Figure 2:
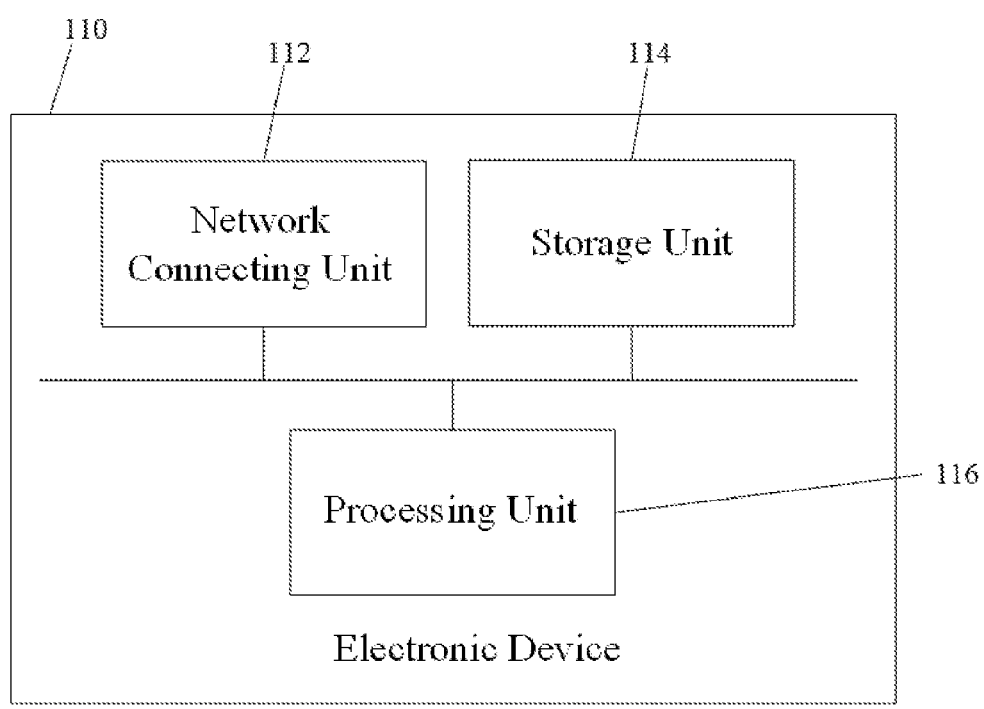
FIG. 2 is a schematic diagram illustrating an embodiment of an electronic device of the invention.

FIG. 2 is a schematic diagram illustrating an embodiment of an electronic device of the invention. As shown in FIG. 2, the electronic device 110 comprises a network connecting unit 112, a storage unit 114, and a processing unit 116. The network connecting unit 112 can be used to connect to a network, such as a wired network, a telecommunication network, and/or a wireless network. The electronic device 110 can have network connectivity capabilities by using the network connecting unit 112. The storage unit 114 can comprise related data corresponding to respective user devices and/or respective registered users. The storage unit 114 can comprise data which is posted by the respective users and posted to the social network system. The storage unit 114 can also store social interactions between users, such as specific operations regarding specific data performed by other users, in which the specific data is posted and uploaded by a specific user. The specific operation may be a collection, sharing, and/or comment corresponding to the specific data. It is understood that, in some embodiments, the data uploaded to the social network system by a user may comprise data corresponding to a business card, a flyer, a credit card, a debit card, a membership card, a billboard, a signboard, and/or a CIS (Corporate Identity System). It is noted that, the above data is only an example of the application, and the present invention is not limited thereto. The processing unit 116 can control related operations of hardware and software in the electronic device 110, and perform the data analysis and management method for social networks of the present invention, which will be discussed later.

Figure 3:
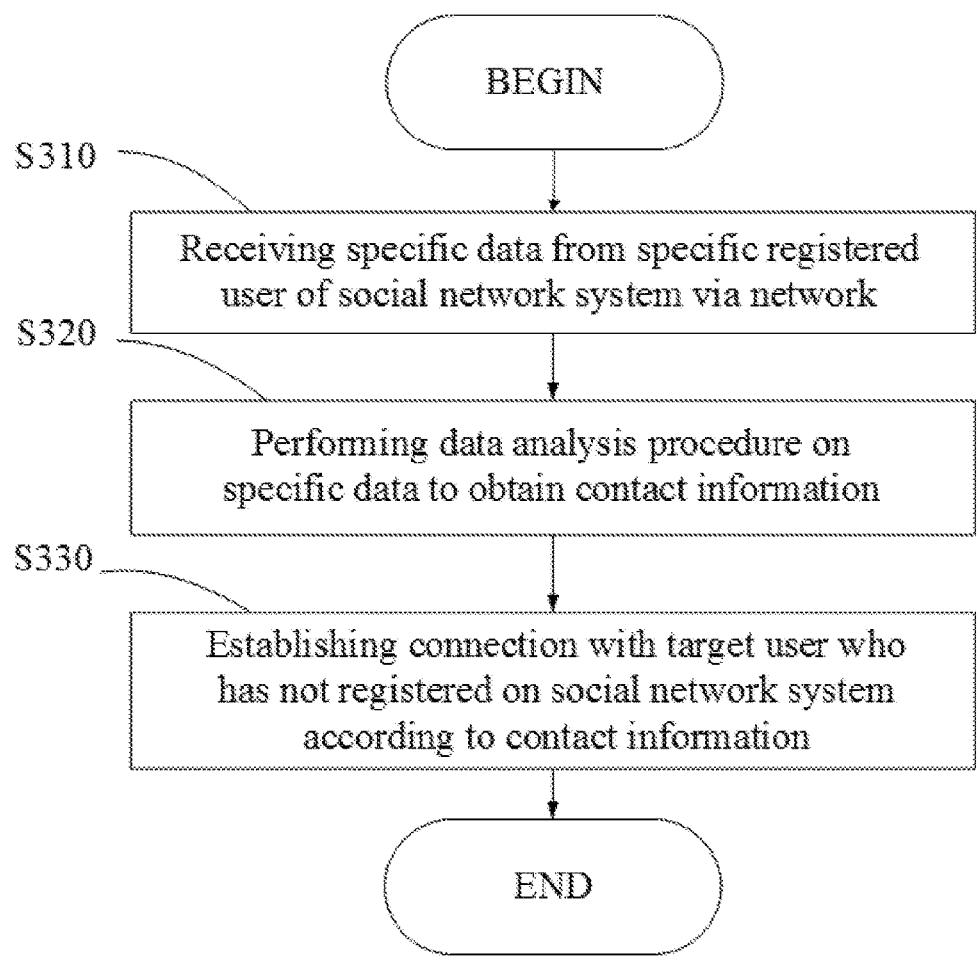
FIG. 3 is a flowchart of an embodiment of a data analysis and management method for social networks of the invention.

FIG. 3 is a flowchart of an embodiment of a data analysis and management method for social networks of the invention. The data analysis and management method for social networks can be used in an electronic device as shown in FIG. 2. It is noted that, the electronic device can provide services corresponding to a social network system. In step S310, specific data is received from a specific registered user of a social network system via a network. It is understood that, in some embodiments, the specific data may comprise data corresponding to a business card, a flyer, a credit card, a debit card, a membership card, a billboard, a signboard, and/or a CIS. It is noted that, the above data is only an example of the application, and the present invention is not limited thereto. In step S320, the specific data is processed with a data analysis procedure to obtain at least one contact information based on the specific data. It is understood that, in some embodiments, the data analysis procedure performs an analysis on at least a text, number, symbol, and/or figure in the specific data to obtain the contact information. It is noted that, in some embodiments, the text, number, symbol, and/or figure in the specific data can be filtered according to a filtering rule in the data analysis procedure, thus to obtain accurate and valid contact information. It is understood that, in some embodiments, the contact information may comprise a physical address, an email address, and/or a phone number. Then, in step S330, a connection with at least one target user who has not registered on the social network system is established according to the contact information. It is understood that, in some embodiments, an email message, a short message, and/or a physical mail can be transmitted to the target user according to the contact information, so that a connection with the target user is established.

Figure 4:
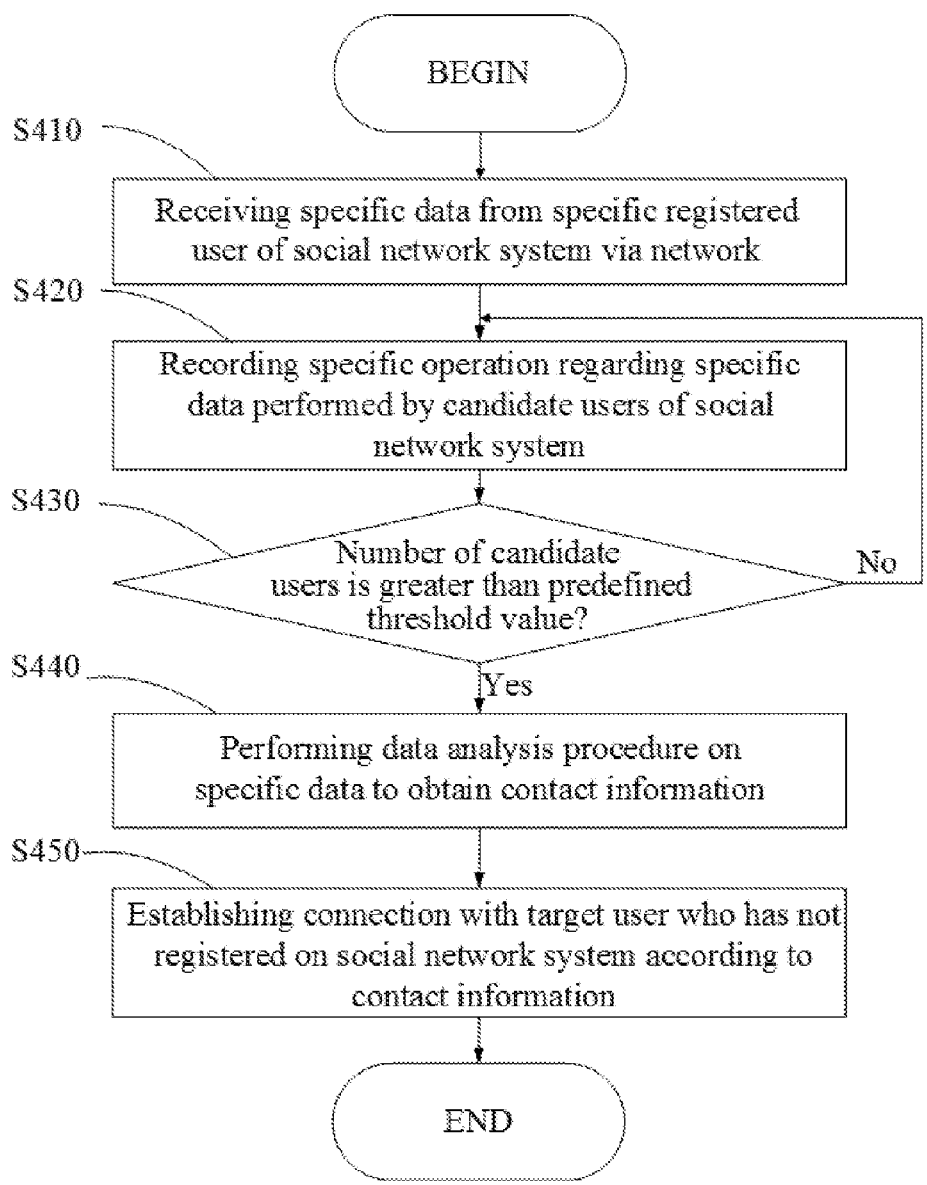
FIG. 4 is a flowchart of another embodiment of a data analysis and management method for social networks of the invention.

FIG. 4 is a flowchart of another embodiment of a data analysis and management method for social networks of the invention. The data analysis and management method for social networks can be used in an electronic device as shown in FIG. 2. It is noted that, the electronic device can provide services corresponding to a social network system. In step S410, specific data is received from a specific registered user of a social network system via a network. Similarly, in some embodiments, the specific data may comprise data corresponding to a business card, a flyer, a credit card, a debit card, a membership card, a billboard, a signboard, and/or a CIS. It is noted that, the above data is only example of the application, and the present invention is not limited thereto. In step S420, at least one specific operation regarding the specific data performed by a plurality of candidate users of the social network system is recorded. It is noted that, any user or friends of the specific user of the social network system can perform the above specific operation regarding the specific data. In some embodiments, the specific operation may be a collection, sharing, and/or comment corresponding to the specific data. In step S430, it is determined whether the number of the candidate users is greater than a predefined threshold value. When the number of the candidate users is not greater than the predefined threshold value (No in step S430), the procedure returns to step S420. When the number of the candidate users is greater than the predefined threshold value (Yes in step S430), in step S440, the specific data is processed with a data analysis procedure to obtain at least one contact information based on the specific data. Similarly, in some embodiments, the data analysis procedure performs an analysis on at least a text, number, symbol, and/or figure in the specific data to obtain the contact information. It is noted that, in some embodiments, the text, number, symbol, and/or figure in the specific data can be filtered according to a filtering rule in the data analysis procedure, thus to obtain accurate and valid contact information. In some embodiments, the contact information may comprise an address, an email address, and/or a phone number. Then, in step S450, a connection with at least one target user who has not registered on the social network system is established according to the contact information. It is understood that, in some embodiments, an email message, a short message, and/or a physical mail can be transmitted to the target user according to the contact information, so that a connection with the target user is established.

It is noted that, in some embodiments, step S430 can be replaced by a step of determining whether the number of times corresponding to the performance of the specific operation is greater than a predefined number of times. When the number of times corresponding to the performance of the specific operation is greater than the predefined number of times, the data analysis procedure is performed on the specific data. For example, when the specific data is respectively collected by users, and the number of collections corresponding to the specific data is greater than the predefined number of times, the specific data is processed with the data analysis procedure.

Figure 5:
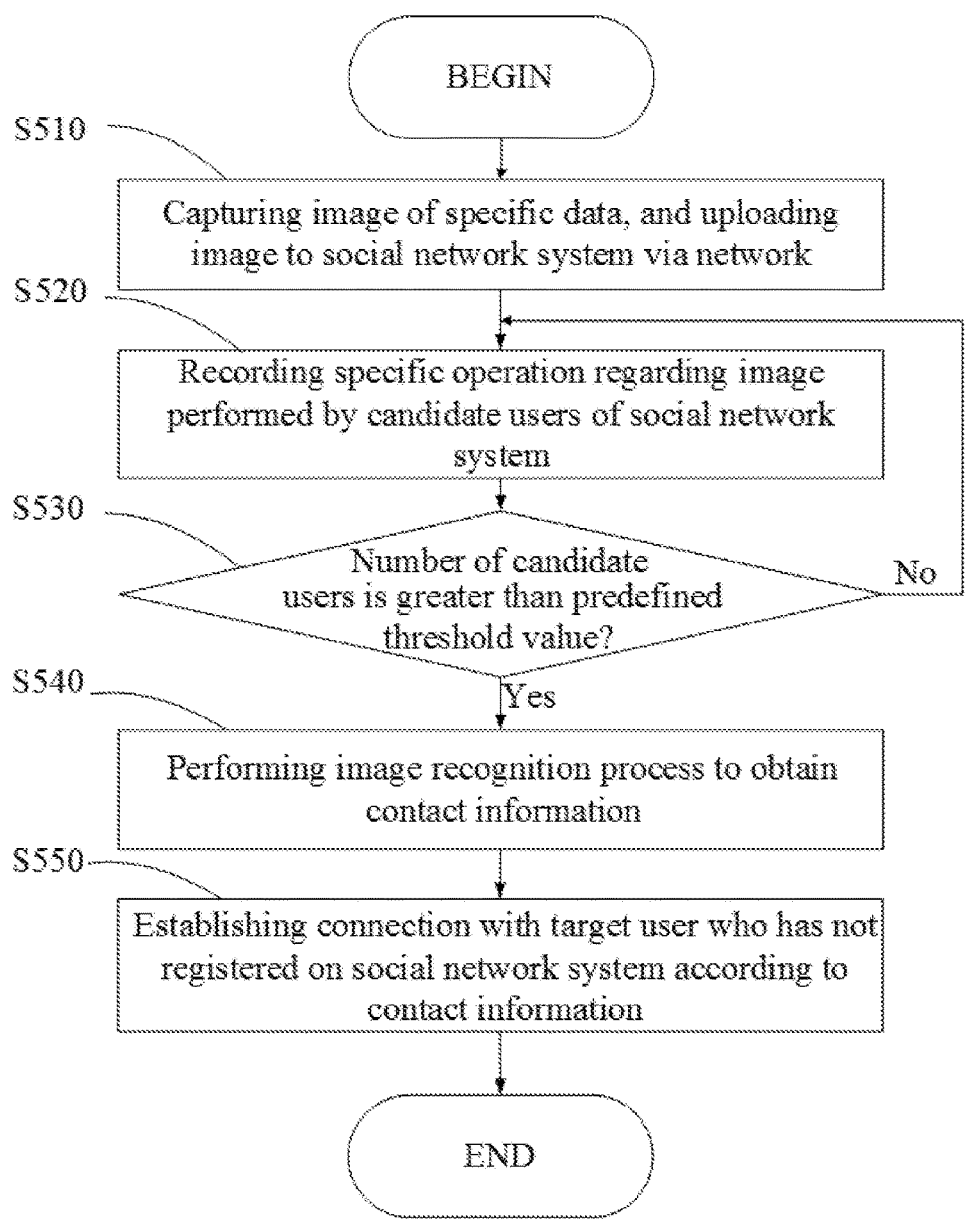
FIG. 5 is a flowchart of another embodiment of a data analysis and management method for social networks of the invention.

FIG. 5 is a flowchart of another embodiment of a data analysis and management method for social networks of the invention. The data analysis and management method for social networks can be used in an electronic device as shown in FIG. 2. It is noted that, the electronic device can provide services corresponding to a social network system.

In step S510, a specific user obtains specific data comprising an image by using an image capture unit of a user device. The specific user uploads the image to the social network system via a network by using the user device. Similarly, in some embodiments, the specific data may comprise data corresponding to a business card, a flyer, a credit card, a debit card, a membership card, a billboard, a signboard, and/or a CIS. It is noted that, the above data is only an example of the application, and the present invention is not limited thereto. In step S520, at least one specific operation regarding the uploaded image performed by a plurality of candidate users of the social network system is recorded. Similarly, any user or friends of the specific user of the social network system can perform the above specific operation regarding the uploaded image. In some embodiments, the specific operation may be a collection, sharing, and/or comment corresponding to the uploaded image. In step S530, it is determined whether the number of the candidate users is greater than a predefined threshold value. When the number of the candidate users is not greater than the predefined threshold value (No in step S530), the procedure returns to step S520. When the number of the candidate users is greater than the predefined threshold value (Yes in step S530), in step S540, the image is processed with a data analysis procedure, wherein the data analysis procedure performs an image recognition process on the image to obtain at least a text, number, symbol, and/or figure in the image, and determines at least one contact information according to the text, number, symbol, and/or figure. It is noted that, in some embodiments, the text, number, symbol, and/or figure generated from the image can be filtered according to a filtering rule in the data analysis procedure, thus to obtain accurate and valid contact information. In some embodiments, the contact information may comprise an address, an email address, and/or a phone number. Then, in step S550, a connection with at least one target user who has not registered on the social network system is established according to the contact information. It is understood that, in some embodiments, an email message, a short message, and/or a physical mail can be transmitted to the target user according to the contact information, so that a connection with the target user is established.

Similarly, in some embodiments, step S530 can be replaced by a step of determining whether the number of times corresponding to the performance of the specific operation is greater than a predefined number of times. When the number of times corresponding to the performance of the specific operation is greater than the predefined number of times, the data analysis procedure is performed to the image.

Figure 6:
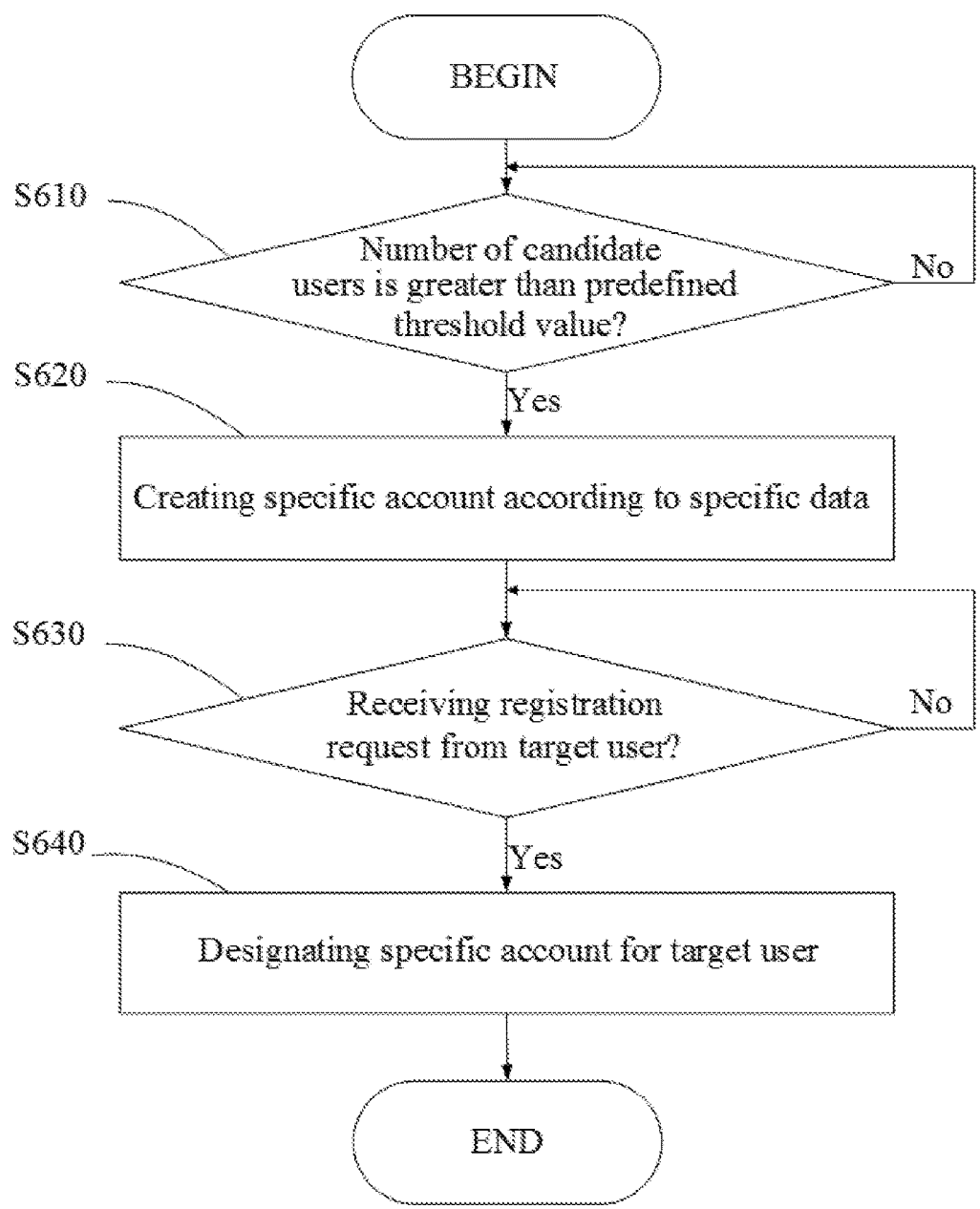
FIG. 6 is a flowchart of another embodiment of a data analysis and management method for social networks of the invention.

FIG. 6 is a flowchart of another embodiment of a data analysis and management method for social networks of the invention. The data analysis and management method for social networks can be used in an electronic device as shown in FIG. 2. It is noted that, the electronic device can provide services corresponding to a social network system, and record specific operations regarding specific data performed by a plurality of candidate users of the social network system, wherein the specific operation may be a collection, sharing, and/or comment corresponding to the uploaded image.

In step S610, it is determined whether the number of the candidate users is greater than a predefined threshold value. When the number of the candidate users is not greater than the predefined threshold value (No in step S610), the procedure remains at step S610. When the number of the candidate users is greater than the predefined threshold value (Yes in step S610), in step S620, a specific account is created according to the specific data. It is understood that, in some embodiments, related operation regarding the specific data and related information corresponding to the candidate users can be associated to the specific account. Similarly, in some embodiments, step S610 can be replaced by a step of determining whether the number of times corresponding to the performance of the specific operation is greater than a predefined number of times. When the number of times corresponding to the performance of the specific operation is greater than the predefined number of times, a specific account is created according to the specific data. In step S630, it is determined whether a registration request for the social network system is received from a target user corresponding to the specific data via a network. It is understood that, in some embodiments, the social network system can establish a connection with the target user according to the contact information obtained from the specific data in advance. When a registration request for the social network system is not received from the target user (No in step S630), the procedure remains at step S630. When a registration request for the social network system is received from the target user (Yes in step S630), in step S640, the specific account is designated for the target user.

Figure 7:
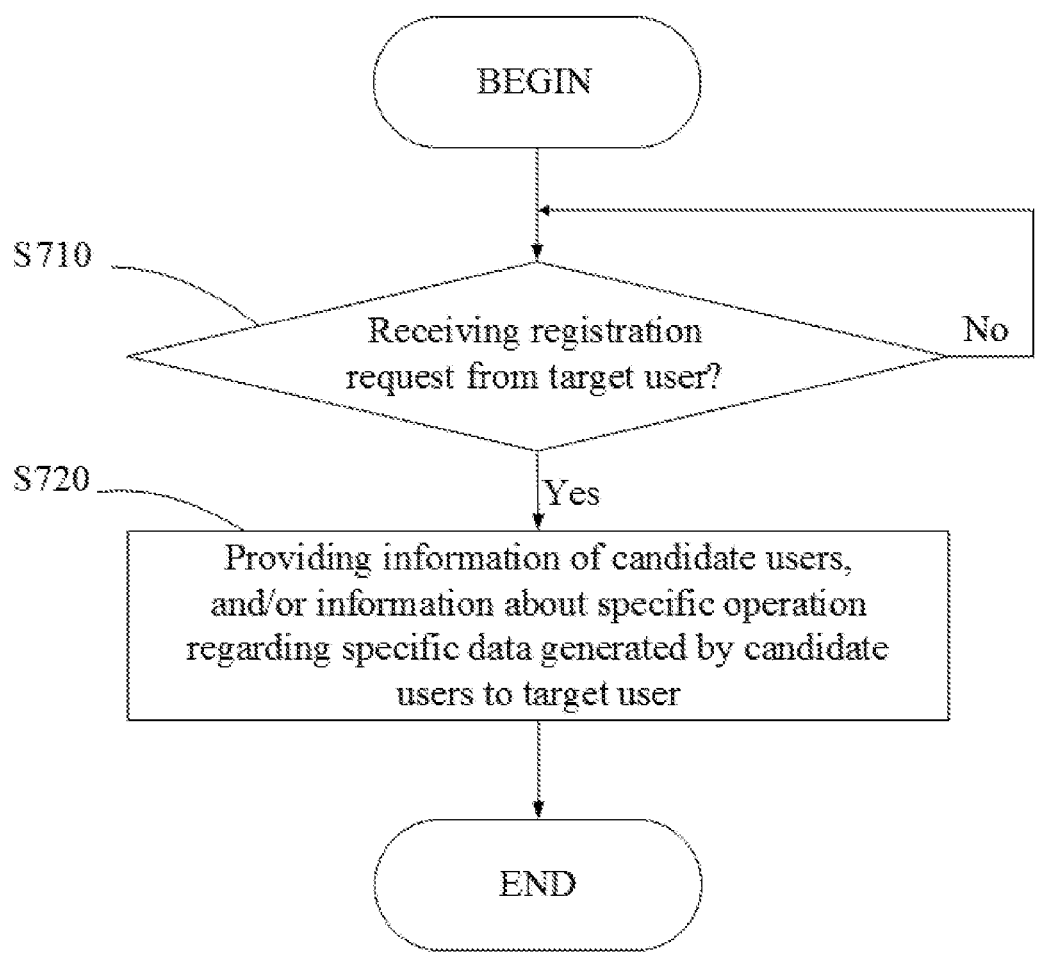
FIG. 7 is a flowchart of another embodiment of a data analysis and management method for social networks of the invention.

FIG. 7 is a flowchart of another embodiment of a data analysis and management method for social networks of the invention. The data analysis and management method for social networks can be used in an electronic device as shown in FIG. 2. It is noted that, the electronic device can provide services corresponding to a social network system, and record specific operations regarding specific data performed by a plurality of candidate users of the social network system, wherein the specific operation may be a collection, sharing, and/or comment corresponding to the uploaded image.

In step S710, it is determined whether a registration request for the social network system is received from a target user corresponding to the specific data via a network. Similarly, in some embodiments, the social network system can establish a connection with the target user according to the contact information obtained from the specific data in advance. When a registration request for the social network system is not received from the target user (No in step S710), the procedure remains at step S710. When a registration request for the social network system is received from the target user (Yes in step S710), in step S720, information corresponding to the candidate users, and/or information about the specific operation regarding the specific data generated by the candidate users is provided to the target user.

Figure 8:
FIG. 8 is a schematic diagram illustrating an example of specific data of the invention.

FIG. 8 is a schematic diagram illustrating an example of specific data of the invention. In the example, the specific data may be a business card. A specific user can capture an image 800 corresponding to the business card using a camera of a smart phone, and upload the image 800 to a social network system via a network. Any user or friends of the specific user can perform related operations regarding the image 800 uploaded by the specific user. For example, any user can collect the image 800 corresponding to the business card. When the number of users who collect the image 800 is greater than a predefined threshold value, such as 100 users, or when the number of times corresponding to the collection of the image 800 is greater than a predefined number of times, such as 100 times, the electronic device providing the services corresponding to the social network system can perform an image recognition process on the image 800 to obtain at least a text, number, symbol, and/or figure in the image 800, and determines at least one contact information according to the text, number, symbol, and/or figure. In the example, contact information, such as "02-7722-0677", "0937168168", "15F., No.19-13, Sanchong Rd., Nangang District, TaipeiCity 115, Taiwan", and "Service@FireBull.com" can be obtained from the image 800. The electronic device can establish a connection with a target user according to the contact information. For example, a short message can be transmitted to the phone number "0937168168", an email message can be transmitted to the email address "Service@FireBull.com", and/or a physical mail can be sent to the address "15F., No.19-13, Sanchong Rd., Nangang District, TaipeiCity 115, Taiwan". Additionally, the electronic device can create a specific account, such as an account called "FireBull" on the social network system according to the contact information. When a registration request for the social network system is received from the target user, the specific account can be designated for the target user. Furthermore, information corresponding to the users who performed operations regarding the image 800, and/or information about the operations regarding the image 800 generated by users can be provided to the target user.

Therefore, the data analysis and management methods and systems for social networks of the present invention can perform related analyses on data on social network systems, and perform additional managements on the data according to the result of data analyses, thereby activating the data on the social network systems, and increasing the applicability of data on the social network systems.

Data analysis and management methods for social networks may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A data analysis and management method for social networks for use in an electronic device, comprising:
    receiving specific data from a specific registered user of a social network system via a network;
    recording at least one specific operation regarding the specific data performed by a plurality of candidate users of the social network system, wherein the specific operation comprises a collection, sharing, or commenting corresponding to the specific data;
    performing a data analysis procedure on the specific data to obtain at least one contact information based on the specific data, wherein it is determined whether a number of the candidate users is greater than a predefined threshold value or whether a number of times corresponding to the performance of the specific operation is greater than a predefined number of times, and the data analysis procedure is performed on the specific data when the number of the candidate users is greater than the predefined threshold value or when the number of the candidate users is greater than the predefined threshold value; and
    establishing a connection with at least one target user who has not registered on the social network system according to the contact information.

2. The method of claim 1, wherein the specific user obtains the specific data by using an image capture unit, and the specific data comprises an image.

3. The method of claim 2, wherein the data analysis procedure performs an image recognition process on the image to obtain at least a text, number, symbol, or figure in the image, and determines the contact information according to the text, number, symbol, or figure.

4. The method of claim 1, wherein the contact information comprises a physical address, an email address, or a phone number, and an email message, a short message, or a physical mail is transmitted to the target user according to the contact information, so that a connection with the target user is established.

5. The method of claim 1, further comprising:
    creating a specific account according to the specific data;
    receiving a registration request for the social network system from the target user via a network; and designating the specific account for the target user in response to the registration request.

6. The method of claim 1, further comprising:
receiving a registration request for the social network system from the target user via a network; and
providing information corresponding to the candidate users, or information about the specific operation regarding the specific data generated by the candidate users to the target user in response to the registration request.

7. A data analysis and management system for social networks for use in an electronic device, comprising:
a network connecting unit receiving specific data from a specific registered user of a social network system via a network;
a storage unit storing the specific data; and
a processing unit recording at least one specific operation regarding the specific data performed by a plurality of candidate users of the social network system, wherein the specific operation comprises a collection, sharing, or commenting corresponding to the specific data, performing a data analysis procedure on the specific data to obtain at least one contact information based on the specific data, wherein it is determined whether a number of the candidate users is greater than a predefined threshold value, or whether a number of times corresponding to the performance of the specific operation is greater than a predefined number of times, and the data analysis procedure is performed on the specific data when the number of the candidate users is greater than the predefined threshold value or when the number of the candidate users is greater than the predefined threshold value, and establishing a connection with at least one target user who has not registered on the social network system according to the contact information.

8. A non-transitory machine-readable storage medium comprising a computer program, which, when executed, causes a device to perform a data analysis and management method for social networks, wherein the method comprises:
receiving specific data from a specific registered user of a social network system via a network;
recording at least one specific operation regarding the specific data performed by a plurality of candidate users of the social network system, wherein the specific operation comprises a collection, sharing, or commenting corresponding to the specific data;
performing a data analysis procedure on the specific data to obtain at least one contact information based on the specific data, wherein it is determined whether a number of the candidate users is greater than a predefined threshold value, or whether a number of times corresponding to the performance of the specific operation is greater than a predefined number of times, and the data analysis procedure is performed on the specific data when the number of the candidate users is greater than the predefined threshold value or when the number of the candidate users is greater than the predefined threshold value; and
establishing a connection with at least one target user who has not registered on the social network system according to the contact information.

\* \* \* \* \*